United States Patent

Back

[19]

[11] Patent Number: 5,930,071

[45] Date of Patent: Jul. 27, 1999

[54] DISK DRIVE ASSEMBLY WITH VIBRATION DAMPENING PIVOT ASSEMBLY

[75] Inventor: Forest Hiram Back, Dayton, Ohio

[73] Assignee: Rubber-Tech, Inc., Dayton, Ohio

[21] Appl. No.: 08/820,116

[22] Filed: Mar. 19, 1997

Related U.S. Application Data

[63] Continuation-in-part of application No. 08/446,528, May 19, 1995, abandoned, and application No. 08/445,345, May 19, 1995, abandoned.

[51] Int. Cl.$^6$ ............................ G11B 21/02; G11B 33/14; G11B 5/55

[52] U.S. Cl. .................................. 360/97.01; 360/97.02; 360/106

[58] Field of Search ............................ 360/97.01, 97.02, 360/97.03, 104, 105, 106, 109, 98.07, 99.08, 99.04; 384/536, 582; 310/67 R

[56] References Cited

U.S. PATENT DOCUMENTS

| | | | |
|---|---|---|---|
| 2,193,549 | 3/1940 | Chamberlin | 384/536 |
| 2,283,839 | 5/1942 | Wright | 384/536 |
| 2,414,335 | 1/1947 | Schroeder | 384/536 |
| 2,608,451 | 8/1952 | Pierce, Jr. | 384/536 |
| 4,144,466 | 3/1979 | Hatch | 310/13 |
| 4,647,803 | 3/1987 | von der Heide et al. | 310/67 R |
| 4,683,505 | 7/1987 | Schmidt et al. | 360/133 |
| 4,730,227 | 3/1988 | Chong et al. | 360/106 |
| 4,831,476 | 5/1989 | Branc et al. | 360/97.02 |
| 4,833,667 | 5/1989 | Castagna et al. | 360/98.07 |
| 4,870,703 | 9/1989 | Augeri et al. | 360/98.07 |
| 4,896,239 | 1/1990 | Ghose | 360/106 |
| 4,945,432 | 7/1990 | Matsudaira et al. | 360/98.02 |
| 4,984,115 | 1/1991 | Takahashi et al. | 360/106 |
| 5,031,061 | 7/1991 | Hatch | 360/98.07 |
| 5,060,209 | 10/1991 | Kobayashi | 369/32 |
| 5,124,855 | 6/1992 | Dew et al. | 360/97.02 |
| 5,140,478 | 8/1992 | Yoshida | 360/97.01 |
| 5,200,940 | 4/1993 | Goto et al. | 369/44.15 |
| 5,220,548 | 6/1993 | Nakatsukasa et al. | 369/36 |
| 5,235,482 | 8/1993 | Schmitz | 360/97.02 |
| 5,241,229 | 8/1993 | Katakura et al. | 310/67 R |
| 5,376,850 | 12/1994 | Elsing et al. | 310/67 R |
| 5,430,589 | 7/1995 | Moir et al. | 360/98.07 |

FOREIGN PATENT DOCUMENTS

| | | |
|---|---|---|
| 3918953 | 12/1989 | Germany . |
| 62-287465 | 12/1987 | Japan . |
| 1-143063 | 9/1989 | Japan . |
| 2-230566 | 9/1990 | Japan . |
| 3-296909 | 12/1991 | Japan . |
| 4-30366 | 2/1992 | Japan . |
| 5-198081 | 8/1993 | Japan . |
| 5-336722 | 12/1993 | Japan . |

OTHER PUBLICATIONS

IBM Technical Disclosure Bulletin vol. 26, No. 3B Aug. 1983, Beuch, "Resilient Ring for Isolating a motor . . . " pp. 1664–1665.

*Primary Examiner*—David L. Ometz
*Attorney, Agent, or Firm*—Killworth, Gottman, Hagan & Schaeff, L.L.P.

[57] ABSTRACT

A disk drive having vibration dampening elements and a method for dampening vibrations in disk drives. The disk drive includes a pivot assembly rotatably supporting an actuator assembly and a motor for rotating one or more disk-like recording media. One or more components of the pivot assembly and/or the motor have a rubber-like material molded to a portion thereof. The rubber-like material acts to reduce vibrations within the disk drive.

21 Claims, 5 Drawing Sheets

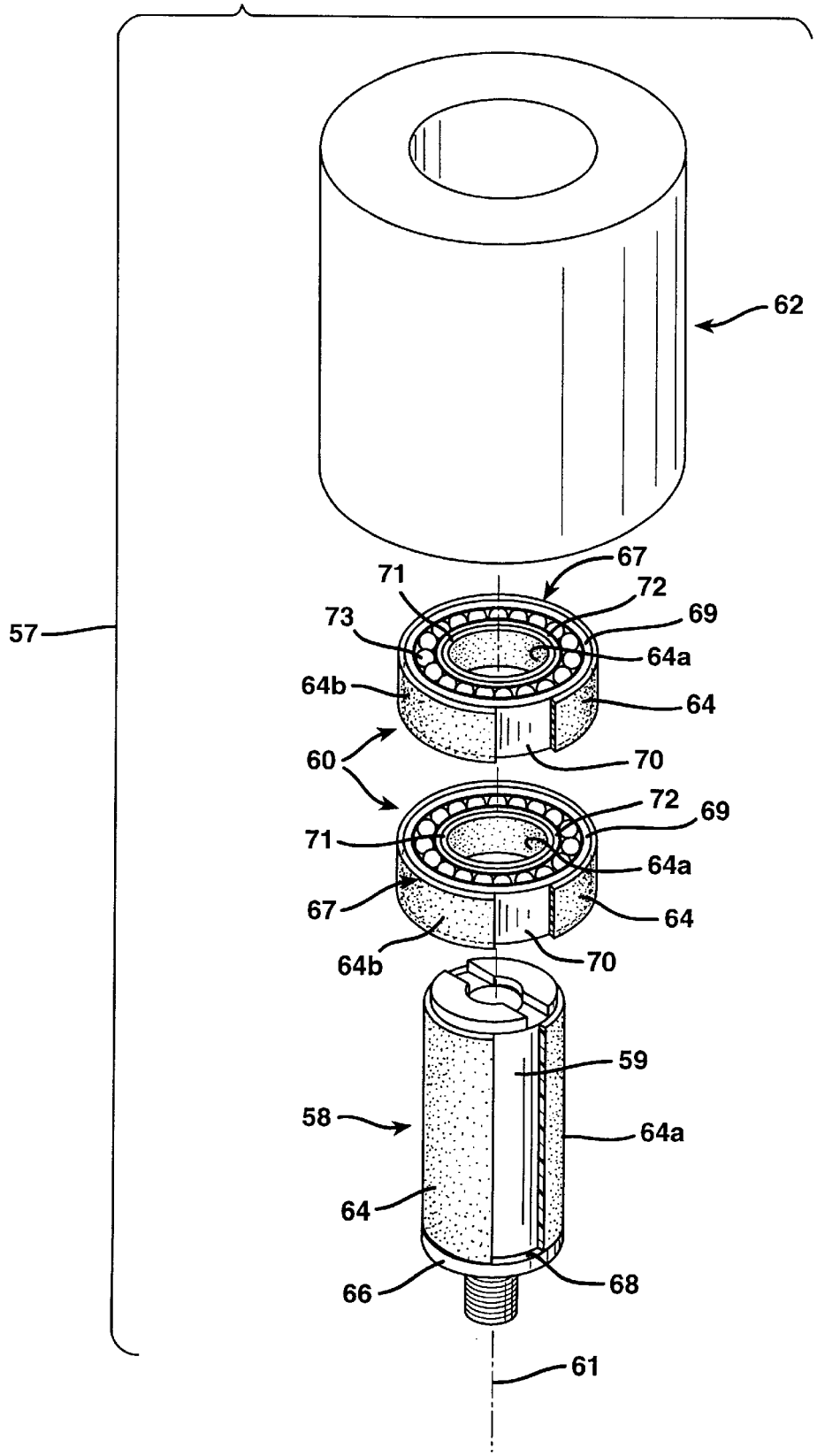

DISK DRIVE ASSEMBLY WITH VIBRATION DAMPENING PIVOT ASSEMBLY

RELATED APPLICATIONS

The present application is a continuation-in-part of U.S. patent application Ser. Nos. 08/446,528 and 08/445,345, both filed May 19, 1995 now abandoned, and both entitled DISK DRIVE HAVING VIBRATION DAMPENING ELEMENTS AND METHOD FOR DAMPENING VIBRATION IN DISK DRIVES.

FIELD OF THE INVENTION

The present invention relates to disk drives, more particularly to an apparatus and method for dampening vibrations in a disk drive having a pivot assembly, and even more particularly to an apparatus and method for dampening vibrations in the pivot assembly of a disk drive by molding a rubber-like material onto one or more portions of the pivot assembly.

BACKGROUND OF THE INVENTION

Disk drives of the type known as "Winchester" drives or hard drives are well known in the industry. These disk drives are typically used in computer systems as mass storage devices to store recorded data. These disk drives usually incorporate one or more rigid disks coated with a magnetizable medium, mounted for rotation at a constant high speed on the hub of a brushless DC spindle motor. Data is recorded to and read from a plurality of concentric, circular tracks on the disks by an array of read/write heads. These heads are incorporated in assemblies which interact with the air pulled along by the spinning disks to "fly" the heads in close proximity to the disk surface. The heads are typically moved radially from track to track on the disks by an actuator assembly. A typical actuator assembly includes an actuator motor, a guidance mechanism to control the path of motion of the heads and support mechanisms to attach the heads to the moving actuator and support the heads in correct relationship to the disks. One such actuator assembly includes an actuator arm for supporting the read/write heads and a pivot assembly for rotatably supporting the actuator arm. The pivot assembly allows the heads to be moved radially with respect to the disks. A typical pivot assembly includes a pivot shaft around which the actuator arm pivots and one or two bearings mounted between the pivot shaft and a housing supporting the actuator arm.

Advances in disk drive technology have revolved around reducing the size of disk drive components and the size of the overall disk drive. Smaller disk drives can allow for a reduction in the overall size of the computer system into which the disk drives are installed. With the reduction in the size of the disk drive, more space is available within the computer system for other components. In addition to the small disk drives, the disk drive industry has also made advances toward increasing the storage capacity of individual disk drive units. This increased capacity has been brought about by increases in the linear density and track density of the magnetic disks.

The reduction in size of the disk drive can compound certain problems often associated with various operational features of disk drives. One such problem involves vibrations or harmonic oscillations in the disk drive. All disk drives experience a level of vibration or harmonic oscillations from various moving parts or electronic switching from within the disk drive or from the computer system. The effect of vibrations and oscillations has become magnified as the size of the drive is reduced and data tracks are spaced closer together. As a result, the overall performance of the drive is negatively impacted. In response to this problem, a number of solutions have been investigated which employ the use of rubber-like materials or elastomers within the disk drive for vibration dampening. However, these solutions have been found to have limited success.

Accordingly, there is a continuing need for additional methods to reduce vibration levels in disk drives even further and there is a need for a disk drive assembly exhibiting improved vibration dampening characteristics.

SUMMARY OF THE INVENTION

The present invention satisfies these needs by providing a method for dampening vibrations in disk drives having an actuator assembly which radially moves at least one head, for recording and/or reading information, relative to one or more disk-like recording media, and by providing such a disk drive assembly with a pivot assembly which provides the disk drive assembly with improved vibration dampening characteristics. At least one elastomer or rubber-like material is molded so as to bond to one or more portions of the pivot assembly in such a way that the vibration dampening characteristics of the disk drive assembly are improved.

In accordance with one aspect of the present invention, a disk drive assembly is provided which has one or more disk-like recording media, one or more heads for recording and/or reading information on the recording media, an actuator assembly for rotatably supporting and moving each head relative to the recording media so as to record and/or read information on the recording media, and a motor for rotating each recording medium. The actuator assembly includes a pivot assembly having a pivot shaft, a pivot housing and at least one pivot bearing mounted between the pivot shaft and the pivot housing. The pivot housing supports the head and is rotatable around the pivot shaft. At least one rubber-like material is molded so as to chemically and/or mechanically bond to a portion of the pivot shaft, the pivot bearing, the pivot housing or any combination thereof so as to improve vibration dampening characteristics in the disk drive assembly.

To improve the bond being formed with the rubber-like material, it is desirable for the surface being molded to be a primed surface, a textured surface or both.

In another aspect of the present invention, an actuator assembly is provided for use in a disk drive assembly. The actuator assembly rotatably supports and moves one or more heads relative to one or more disk-like recording media of the disk drive assembly so as to record and/or read information on each recording medium. The actuator assembly includes a pivot assembly having a pivot shaft, a pivot housing and at least one pivot bearing assembly mounted between the pivot shaft and the pivot housing. The pivot shaft has a longitudinal axis and an outer surface. The pivot housing supports the head, is rotatable around the pivot shaft and has an inner surface. The pivot bearing assembly includes an inner race having an inner surface, an outer race having an outer surface and one or more bearings disposed between the inner and outer race. The outer surface of the pivot shaft is bonded to the inner surface of the inner race to form one bond joint. The outer surface of the outer race is bonded to the inner surface of the pivot housing to form another bond joint. At least one rubber-like material is molded in the form of one or more rubber-like elements so as to bond to the outer surface of the pivot shaft, the inner surface of the pivot housing, the inner surface of the inner race, the outer surface of the outer race or any combination thereof.

At least one of the bond joints is partially or fully formed by one or more of the rubber-like elements so as to provide the disk drive assembly with improved vibration dampening characteristics. That is, the rubber-like material can be molded to one or both of the opposing surfaces in the pivot assembly that are being joined together. If only one of these opposing surfaces is being bonded by molding, the other surface can be bonded by any other suitable means such as, for example, with a suitable adhesive.

The pivot shaft is bonded in relation to the inner race and the outer race is bonded in relation to the pivot housing such that the inner race and the outer race are shifted in opposite directions along the longitudinal axis so as to preload the bearing assembly. The amount of preloading is enough to maintain contact between the one or more bearings and the inner and outer race during at least a substantial period of the time that the head is moved by the actuator assembly. It is desirable for the preloading to be enough to maintain such contact during the entire time that the head is moved by the actuator assembly.

In an additional aspect of the present invention, the above described pivot assembly is provided for use in an actuator assembly. The pivot assembly rotatably supports and moves one or more heads relative to one or more disk-like recording media of a disk drive assembly so as to record and/or read information on each recording medium. The pivot assembly includes a pivot shaft, a pivot housing, one or more pivot bearing assemblies mounted between the pivot shaft and the pivot housing, and at least one rubber-like material. The pivot shaft includes a longitudinal axis and an outer surface. The pivot housing supports the head, is rotatable around the pivot shaft and has an inner surface. The rubber-like material is molded in the form of one or more rubber-like elements so as to bond to the outer surface of the pivot shaft, the inner surface of the pivot housing, the inner surface of the inner race and the outer surface of the outer race. The rubber-like element forms at least part of at least one the bond joint so as to provide the disk drive assembly with improved vibration dampening characteristics.

The pivot bearing assembly includes an inner race having an inner surface, an outer race having an outer surface and at least one bearing disposed between the inner and outer race. The outer surface of the pivot shaft is bonded to the inner surface of the inner race to form one bond joint, and the outer surface of the outer race is bonded to the inner surface of the pivot housing to form another bond joint. The pivot shaft is bonded in relation to the inner race and the outer race is bonded in relation to the pivot housing such that the inner race and the outer race are shifted in opposite directions along the longitudinal axis so as to preload the bearing assembly to maintain contact between the bearing and the inner and outer race during the moving of the head by the actuator assembly.

In a further aspect of the present invention, a method is provided for manufacturing a disk drive assembly to improve the vibration dampening characteristics of the disk drive assembly. The method includes the step of providing a pivot assembly that includes a pivot shaft having a longitudinal axis and an outer surface, a pivot housing having an inner surface, one or more pivot bearing assemblies, and at least one rubber-like material. Each bearing assembly has an inner race with an inner surface, an outer race with an outer surface and one or more bearings disposed between the inner and outer race. The method also includes the step of molding at least one rubber-like material in the form of one or more rubber-like elements so as to bond to the outer surface of the pivot shaft, the inner surface of the pivot housing, the inner surface of the inner race, the outer surface of the outer race, or any combination thereof. An additional step of the method is disposing the inner surface of the inner race around the outer surface of the pivot shaft and the inner surface of the pivot housing around the outer surface of the outer race. The method also includes the step of moving the inner race and the outer race in opposite directions along the longitudinal axis so as to preload the bearing assembly to maintain contact between the bearing and the inner and outer race. It is desirable for this contact to be maintained at all times while the pivot housing is rotated around the pivot shaft. Two other steps of the method are bonding the outer surface of the pivot shaft to the inner surface of the inner race so as to form one bond joint, and bonding the outer surface of the outer race to the inner surface of the pivot housing so as to form another bond joint. The pivot shaft is bonded in relation to the inner race and the outer race is bonded in relation to the pivot housing so as to maintain the preload on the bearing assembly, and the rubber-like element forms at least part of at least one bond joint so as to provide the disk drive assembly with improved vibration dampening characteristics.

The method may include the additional step of assembling the pivot assembly into an actuator assembly for rotatably supporting and moving at least one head relative to at least one disk-like recording medium of a disk drive assembly so as to at least one of record and read information on the recording medium. The method may further include the step of assembling the actuator assembly into a disk drive assembly comprising at least one disk-like recording medium, at least one head for at least one of recording and reading information on the recording medium, and a motor for rotating the recording medium, with the pivot housing supports the head and is rotatable around the pivot shaft. Finally, the method may further include the step of operating the disk drive assembly.

These and other objects, and the features and advantages of the present invention will become apparent from the following detailed description, the accompanying drawings and the appended claims.

BRIEF DESCRIPTION OF THE DRAWINGS

FIG. 2A is an exploded perspective view of one pivot assembly of the present invention including a rubber-like material molded to a pivot shaft and two pivot bearings.

DETAILED DESCRIPTION OF THE INVENTION

The present invention relates to a disk drive assembly having vibration dampening components and to a method for dampening vibrations in disk drives. Disk drives experience resonant vibrations due to, for example, movement of various mechanical components within the disk drive and the switching of certain electronic signals in the disk drive or the computer system. In order to assure proper operation of the disk drive, these vibrations must be minimized. The effect of vibrations and oscillations becomes magnified as the size of the drive is reduced and data tracks are spaced closer together. For example, as disk drive actuators become faster, the components of the actuator system and the support mechanism for the heads tend to be mechanically excited by rapid acceleration and deceleration when the heads are moved from track to track. The recording or recovery of data on the disks can only be accomplished if the heads are stable relative to the data tracks. However, if the heads are oscillating at the natural frequency of the actuator/head subassembly, this oscillation can result in the heads moving back and forth about the desired track center to such an extent as to inhibit reliable data transfer. Similarly, the electronic switching of the commutation signals used to drive the spindle motor can result in stimulation of the spindle motor stator structure and sympathetic vibration of the disk drive housing, resulting in unwanted acoustic noise or the transfer of vibration to the critical head positioning mechanisms. As a result, the overall performance of the drive is negatively impacted. The present invention employs the dampening abilities of elastomer or rubber-like materials to at least minimize to a significant degree, if not eliminate, undesirable vibrations.

The present invention will now be described with reference to the particular embodiments shown in the figures. One of ordinary skill in the art will recognize that the present invention can apply to various styles or designs of disk drives including, for example, various hard disk drives, to those utilizing Winchester technology, and to so-called floppy disk drives. In addition, one of ordinary skill in the art will recognize that other types of disk drives such as, for example, optical disk drives employing laser read/write technology may also benefit from the present invention. Finally, one will also recognize that the disk drive depicted in the figures is employed for exemplary purposes only.

Figure 1:
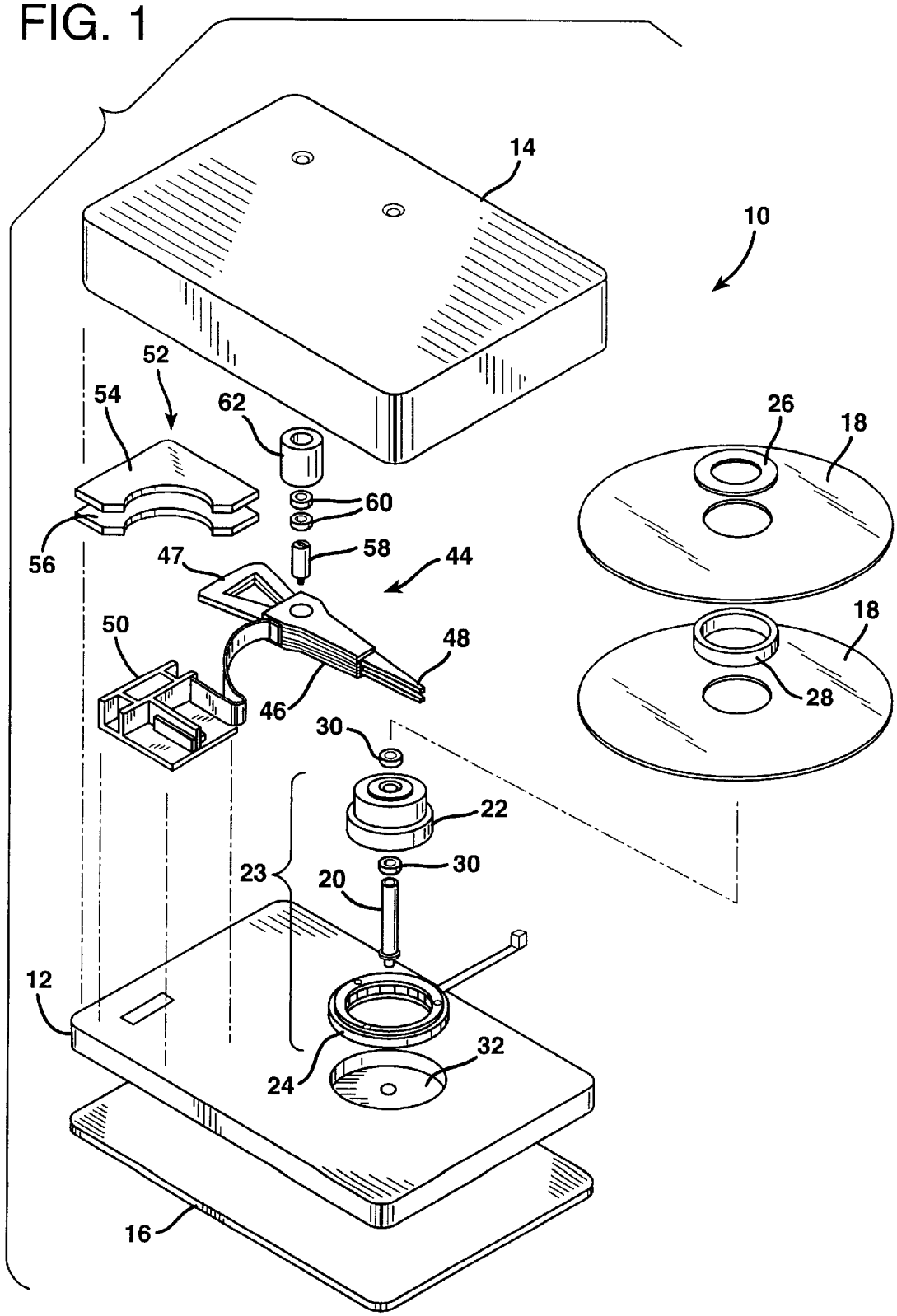
FIG. 1 is an exploded perspective view of a disk drive assembly with which the present invention is particularly useful.

Referring to FIG. 1, there is seen a disk drive assembly 10 of the type with which the present invention is particularly useful. Disk drive assembly 10 includes a lower housing 12 and a top cover or upper housing 14, which together form an enclosure. It is desirable for the enclosure to be sealed. The components of the disk drive assembly 10 are directly or indirectly mounted onto the lower housing 12. Upper housing 14 encloses the internal components of the disk drive assembly 10 to protect the components from external contaminants or other damage. Disk drive assembly 10 includes a printed circuit board 16 and is mounted in a computer system (not shown) for operation of disk drive assembly 10, as is well known in the art.

Disk drive assembly 10 also includes at least one magnetic or optical recording medium or disk 18 for recording and storing information, as is well known in the art. Disk 18 is rotatably mounted to lower housing 12 via motor spindle shaft 20 and motor rotor or hub 22. Motor spindle hub 22 supports disk 18 while motor spindle shaft 20 rotates in response to a sequence of timed, polarity-controlled commutation pulses generated by electronic logic on printed circuit board 16. These commutation pulses, when passed through stator windings 35, shown in FIG. 3C, create magnetic fields which interact with the magnetic field of a plurality of permanent magnets (not shown) mounted in the motor hub 22, in a manner well known to those of skill in the art, to rotate the motor hub 22 at a closely regulated high speed. Thus, motor hub 22 and stator 24 form a motor 23. While the motor 23 depicted is of the type know as a "stationary shaft motor", it will be recognized by one of ordinary skill in the art that other motors, such as "rotating shaft motors" in which the motor spindle shaft 20 rotates in conjunction with the motor hub 22, are within the scope of the present invention. Disk 18 is secured to motor hub 22 via a retaining ring 26 or other means well known in the art.

Disk drive assembly 10 may include two or more disks 18 as is common in the art. When more than one disk 18 is employed, the numerous disks 18 may be separated by means of spacers 28, as is well known in the art. To provide smooth rotation of motor hub 22 and to maintain proper alignment, at least one spindle bearing 30 may be employed between motor spindle shaft 20 and motor hub 22 as is well known in the art. It is desirable for two or more bearings 30 to be employed in multiple locations between motor spindle shaft 20 and motor hub 22. Each of the bearings 30 may be any suitable bearing known in the art such as ball or roller bearings.

Figure 3C:
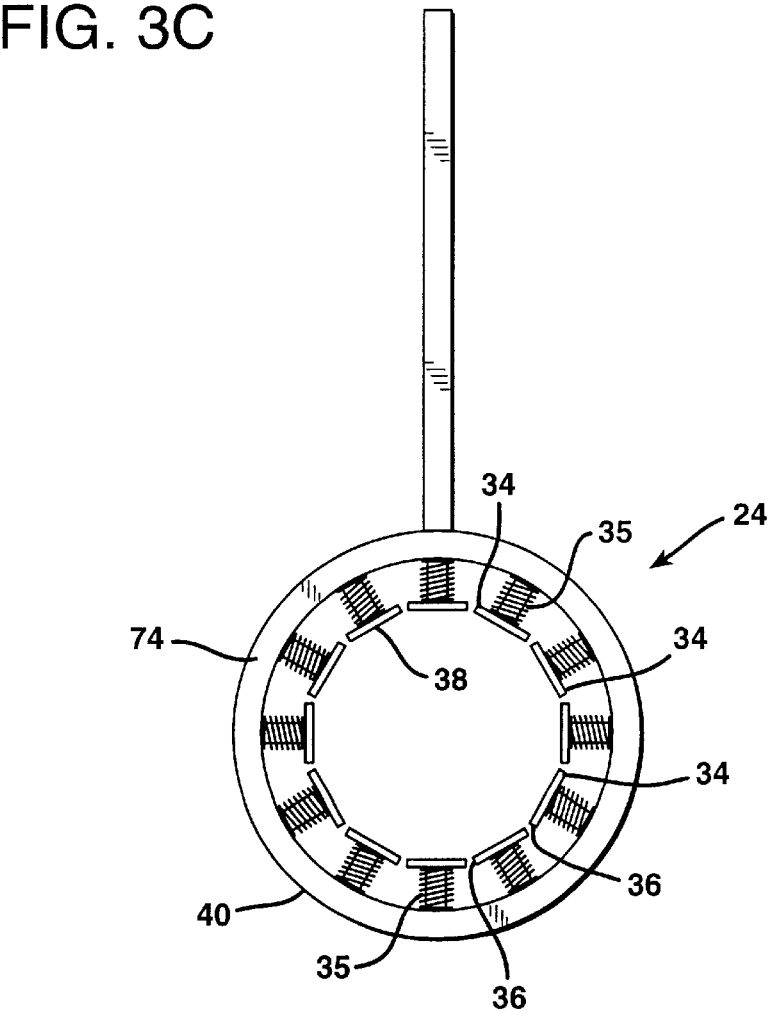
FIG. 3C is a plan view of the motor stator of FIG. 3A without the rubber-like material molded thereto.
Figure 3A:
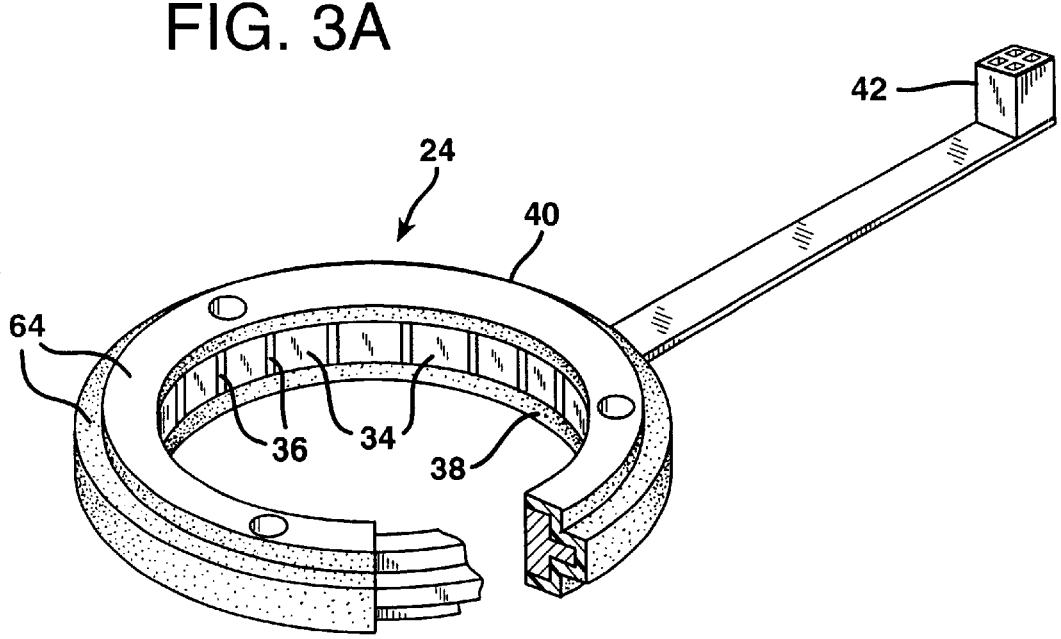
FIGS. 3A and 3B are perspective views of a first and second embodiment of a motor stator according to the present invention with a rubber-like material molded thereto.
Figure 3B:
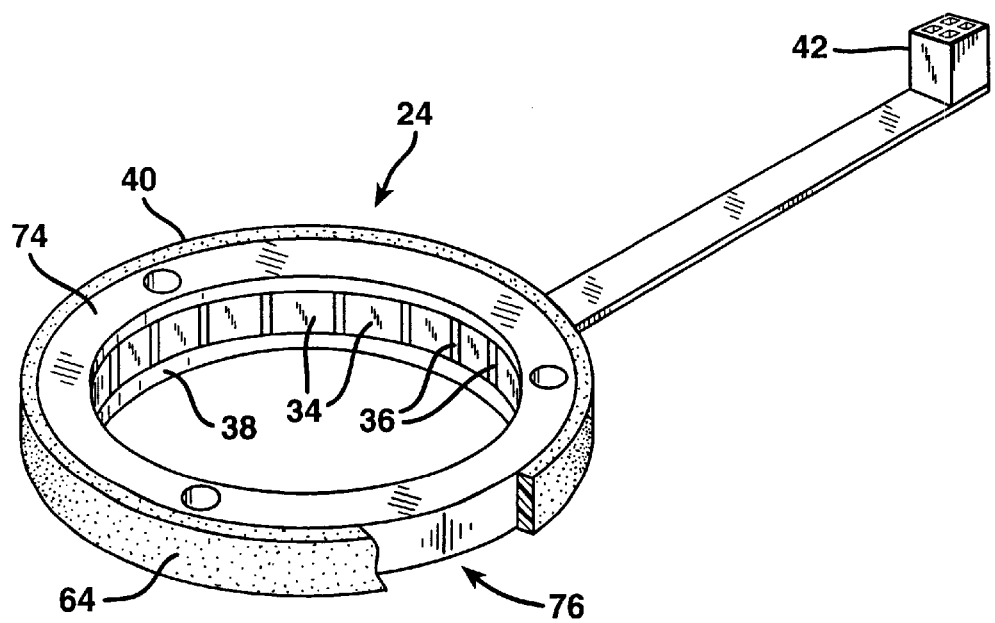

Stator 24 is mounted to the lower housing 12 in a recess 32. Stator 24 may be any stator as is well known in the art. Stator 24 may be formed integrally with the stationary motor spindle shaft 20 or as separate components as shown. In addition, stator 24 includes a number of stator poles 34, wrapped with stator windings 35, as shown in FIG. 3C. Stator poles 34 include stator windings 35 and are separated from one another by stator openings 36. Stator poles 34 may be disposed along the surface of the interior diameter 38 of stator 24 as shown in FIGS. 3A, 3B and 3C or along the surface of the outer diameter 40 (not shown). In addition, stator 24 may include a connector 42 for connecting stator 24 to printed circuit board 16.

Returning to FIG. 1, disk drive assembly 10 also includes an actuator assembly 44. Actuator assembly 44 includes an actuator arm 46 for supporting read/write heads 48. Heads 48 allow information to be recorded or retrieved from the disk-like recording media 18. Read/write heads 48 are connected to the printed circuit board 16 via an electrical connector 50. Actuator arm 48 is adapted for movement over the disk-like recording medium 18 to allow information to be recorded and stored in the proper location. The movement of actuator arm 46 is controlled by voice coil motor 52. Voice coil motor 52 generally comprises a motor coil 47 on the actuator arm 46. When the disk drive is assembled, the motor coil 47 is located within the field of a pair of permanent magnets 54 and 56. Controlled DC currents, generated on printed circuit board 16 and passed through the motor coil 47 generate magnetic fields which interact with the magnetic fields of the permanent magnets 54 and 56 to move the motor coil 47 in accordance with the well known Lorentz relationship.

Actuator assembly 44 also includes a pivot assembly 57 which, in turn, includes a pivot member or shaft 58 which rotatably supports actuator arm 46 via pivot housing 62. To provide smooth rotation of the actuator arm 46 and to keep pivot shaft 58 properly centered, pivot assembly 57 may also include at least one pivot bearing 60 and desirably at least two pivot bearings 60. Each of the pivot bearings 60 is disposed between the pivot member 58 and the pivot housing 62. Each pivot bearing 60 may be any suitable bearing known in the art including ball and roller bearings. Pivot shaft 58 and bearings 60 are enclosed and protected by the pivot housing 62. Pivot housing 62 may be an integral part of the actuator arm 46 or form a separate element as shown.

One of ordinary skill in the art will recognize that the above-described disk drive is a representative example only and the present invention is not intended to be limited to any specific type of disk drive. Other examples of suitable disk drives useful in the present invention U.S. Pat. No. 5,029, 026 to Stefansky et al and U.S. Pat. No. 4,870,703 to Augeri et al, the disclosures of which are both incorporated herein by reference in their entirety.

The present invention also comprises a method of dampening disk drives and of providing a disk drive which has a rubber-like material molded to various elements within the disk drive assembly. The components of the exemplary disk drive assembly 10 to which the rubber-like material will be molded include the motor stator 24, the motor spindle shaft 20, the spindle bearings 30 supporting the motor spindle shaft 20, the pivot shaft 58 of the actuator assembly 44, the pivot bearings 60 and the pivot housing 62. At least one of the above mentioned components molded with a rubber-like material is employed in the present invention. However, any multiple of the above mentioned components may be employed. In particular, employing a rubber-like material on both the pivot shaft 58 and the motor stator 24 is desired. It is more desirable for each of the pivot shaft 58, the motor 23 and the motor spindle shaft 20 to have a rubber-like material molded thereto.

Turning now to FIG. 2A, there is seen the pivot assembly 57. The pivot assembly 57 includes shaft 58, pivot bearings 60 and pivot housing 62. At least one of the pivot shaft 58, the pivot bearings 60 or the pivot housing 62 includes a rubber-like material 64 molded thereto. Pivot shaft 58 has an outside surface 59 and a longitudinal axis 61. Desirably, pivot shaft 58 includes a rubber-like material 64 molded to its outer surface 59. Rubber-like material 64 may be molded to all or any smaller portion of the axial length of the outer surface 59 of the pivot shaft 58. In other words, the entire outer surface 59 of pivot shaft 58 need not be molded with rubber-like material 64. Rather, the rubber-like material 64 can be molded to a smaller portion of the outer surface 59 at the intended location of the pivot bearings 60. It is desirable for the rubber-like material 64 to be molded to substantially the entire outer surface 59 of the pivot shaft 58. Desirably, the outer surface 59 of the pivot shaft 58 will have either a primed surface, a textured surface or both. This primed and/or textured surface facilitates the bonding of the rubber-like material 64 to the outside surface 59 of the pivot shaft 58.

Pivot shaft 58 also may include a lower lip 66, extending horizontally a distance from pivot shaft 58. In such cases, rubber-like material 64 may also be molded to the upper surface 68 of lower lip 66. Rubber-like material 64 acts as a dampener, absorber or minimizer of vibrations or shocks that would otherwise be transferred from the pivot shaft 58 to the actuator arm 46 and thereby read/write heads 48.

In addition, the pivot bearings 60, supporting the pivot housing 62, may also have a rubber-like material molded thereto. The pivot bearings 60 each comprise a bearing assembly 67 which includes an outer race 69 having an outer surface 70 and an inner race 71 having an inner surface 72. At least one bearing 73 is disposed between outer race 69 and inner race 71. Rubber-like material 64 may be molded to either the inner surface 72, the outer surface 70 or both. It is desirable for the rubber-like material 64 to be molded on the inner surface 72. If desired, rubber-like material 64 may be molded on the inner surface 72 of the bearings 60 in conjunction with or in lieu of rubber-like material 64 being molded on the pivot shaft 58. The spindle bearings 30, as shown in FIG. 1, support the motor spindle shaft 20. A rubber-like material 64 may be molded to the spindle bearings 30 in the same way as that shown and described above for the pivot bearings 60 (see FIG. 2A).

Figure 2B:
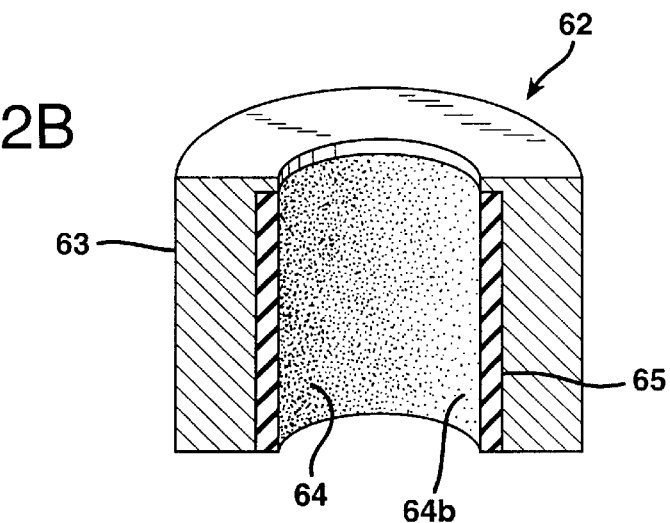
FIG. 2B is a cross-sectional side view of a pivot housing according to the present invention having a rubber-like material molded to an inner diameter thereof.

Referring to FIG. 2B, the pivot housing 62 may also include a rubber-like material molded thereto. The housing 62 includes an outer surface 63 and an inner surface 65. Rubber-like material 64 may be molded to the inner surface 65. It is desirable for substantially all of the inner surface 65 to have the rubber-like material 64 molded thereto. However, the rubber-like material 64 may be molded to any appropriately lesser portion thereof.

In one aspect of the pivot assembly 57, the rubber material 64 is molded in the form of a first rubber-like element 64a so as to be bonded to the outer surface 59 of the pivot shaft 58 and the rubber-like element 64a is also bonded to the inner surface 72 of inner race 71. Further, the outer race 69 is bonded in relation to the pivot housing 62 so that the inner race 71 and the outer race 69 are shifted in opposite directions along the longitudinal axis 61 of pivot shaft 58 so as to preload the bearing assembly 67 to maintain contact between the bearing 73 and the inner race 71 and the outer race 69 during movement of the head 48 by the actuator assembly 44. It is desirable for the preloading to be enough to maintain such contact during the entire time that the head 48 is moved by the actuator assembly 44. Desirably, the outer surface 59 of the pivot shaft 58 will have either a primed surface, a textured surface or both so that the molded bond between the rubber-like element 64a and the outer surface 59 will have sufficient strength to withstand the preload on the bearing assembly 67. It is also desirable that the bond formed by molding the rubber-like element 64a is either a chemical bond, a mechanical bond or both of a sufficient strength to withstand the preload on the bearing assembly 67.

In another aspect of the pivot assembly 57, the rubber material 64 is molded in the form of a rubber-like element 64a so as to be bonded to the outer surface 59 of the pivot shaft 58 and the rubber-like element 64a is bonded to the inner surface 72 of inner race 71. The pivot housing 62 includes on its inner surface 65 a rubber-like material 64 molded in the form of a rubber-like element 64b. The rubber-like element 64b is desirably bonded to the outer surface 70 of outer race 69. Desirably, the inner race 71 and the outer race 69 are shifted in opposite directions along the longitudinal axis 61 of shaft 58 so that the bearing assembly 67 is preloaded to maintain contact between the bearing 73 and the inner race 71 and the outer race 69 during moving of the head 48 by the actuator assembly 44. More desirably, the preloading will be enough to maintain such contact during the entire time that the head 48 is moved by the actuator assembly 44.

In still another aspect of the pivot assembly 57, the rubber-like material 64 is molded in the form of a rubber-like element 64b so as to be bonded to the inner surface 65 of the pivot housing 62. The rubber-like element 64b is also bonded to the outer surface 70 of the outer race 69. The inner surface 72 of the inner race 71 is bonded to the pivot shaft 58 such that the inner race 71 and the outer race 69 are shifted in opposite directions along the longitudinal axis 61 of the pivot shaft 58 so that the bearing assembly 67 is preloaded to maintain contact between the bearing 73 and the inner and outer races 71 and 69, respectively, during the moving of the head 48 by the actuator assembly 44. Desirably, the preloading will be enough to maintain such contact during the entire time that the head 48 is moved by the actuator assembly 44.

In another aspect of the pivot assembly 57, the rubber-like material 64 is molded in the form of a rubber-like element 64a bonded on the inner surface 72 of the inner race 71. The rubber-like element 64a is also bonded to the outer surface 59 of the pivot shaft 58. The outer surface 70 of the outer race 69 is bonded to the inner surface 65 of the pivot housing 62 such that the inner race 71 and the outer race 69 are shifted in opposite directions along the longitudinal axis 61 of the pivot shaft 58 so as to preload the bearing assembly 67 to maintain contact between the bearing 73 and the inner and outer races 71 and 69, respectively, during the moving of the head 48 by the actuator assembly 44. More desirably, the rubber-like material 64 is also molded in the form of a rubber-like element 64b so as to be bonded to the outer surface 70 of the outer race 69. The rubber-like element 64b is also bonded to the inner surface 65 of the pivot housing 62 such that the inner race 71 and the outer race 69 are shifted in opposite directions along the longitudinal axis 61 of the pivot shaft 58 so as to preload the bearing assembly 67 to maintain contact between the bearing 73 and the inner and outer race 71 and 69, respectively, during the moving of the head 48 by the actuator assembly 44. Again, the preloading will desirably be enough to maintain such contact during the entire time that the head 48 is moved by the actuator assembly 44.

In another aspect of the pivot assembly 57, the rubber-like material 64 is molded in the form of a rubber-like element 64b bonded to the outer surface 70 of the outer race 69. The rubber-like element 64b is also bonded to the inner surface 65 of the pivot housing 62. The inner surface 72 of the inner race 71 is bonded to the outer surface 59 of the pivot shaft 59 such that the inner race 71 and the outer race 69 are shifted in opposite directions along the longitudinal axis 61 of the pivot shaft 58 so as to preload the bearing assembly 67 to maintain contact between the bearing 73 and the inner and outer race 71 and 69, respectively, during the moving of the head 48 by the actuator assembly 44.

Turning now to FIGS. 3A–3C, and in particular FIGS. 3A and 3B there is seen the motor stator 24 of the present invention having a rubber-like material 64 molded thereto. The motor stator 24 may be of the kind having stator poles 34 disposed on its inner diameter 38, as shown in FIGS. 3A–3C, or having stator poles 34 disposed on its outer diameter 40 (not shown), as is known in the art, or of any other type known in the art, including both rotating shaft and stationary shaft type motors.

Referring to FIG. 3C, there is seen a motor stator 24 for motor 23 without the rubber-like material 64 molded thereto. Motor 23 may include a motor stator 24, stator poles 34, stator openings 36, an outer stator diameter 40, an inner stator diameter 38, an upper stator surface 74 and a lower stator surface 76. As seen in FIG. 3A, rubber-like material 64 may be molded to encapsulate stator 24 by having rubber-like material molded to the outer diameter 40, upper surface 74, lower surface 76 or any combination thereof. It is desirable for the rubber-like material 64 to be molded so as not to cover the stator poles 34. Therefore, when the stator poles 34 are disposed on the outer diameter 40 of stator 24, it is desirable for the rubber-like material to be molded on the inner diameter 38 and not the outer diameter 40.

Alternatively, rubber-like material 64 may be molded to only the outer diameter 40 as shown in FIG. 3B or to the upper or lower surfaces, 74 and 76, respectively, depending upon the desired application. If stator poles 34 are provided on outer diameter 40 (not shown), then rubber-like material may be molded to the inner diameter 38, upper surface 74, lower surface 76 or any appropriately lesser combination thereof.

Figure 4A:
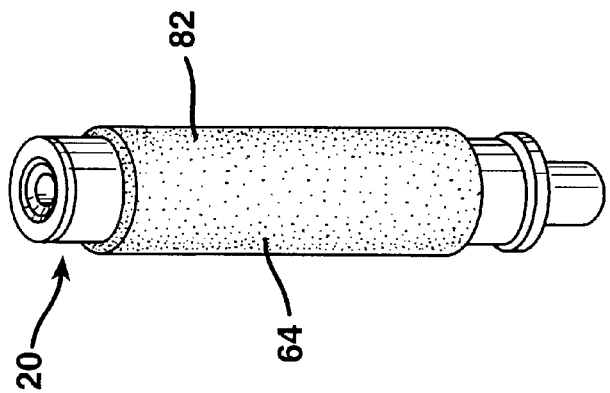
FIGS. 4A, 4B and 4C are perspective views of alternative embodiments of a motor spindle shaft according to the present invention with a rubber-like material molded thereto.
Figure 4B:
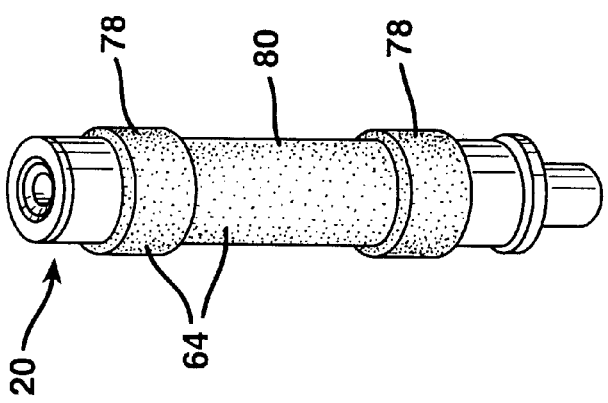
Figure 4C:
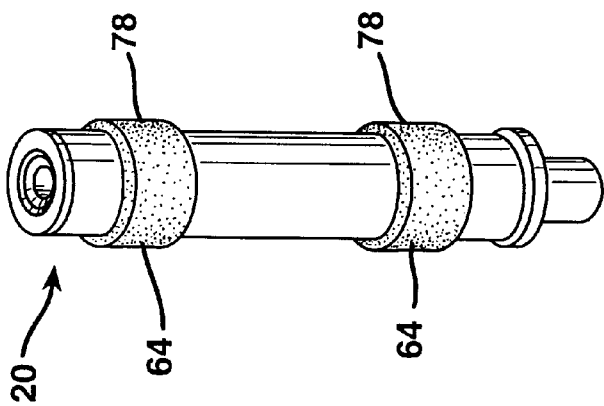

Turning now to FIGS. 4A–4C, there is seen three embodiments of a motor spindle shaft 20 having a rubber-like material 64 molded thereto according to the present invention. Rubber-like material 64 may be molded to all or any portion thereof of motor spindle shaft 20. As can be seen in FIG. 4A, rubber-like material 64 may be molded to the motor spindle shaft 20 in at least one molded section such as, for example, a dual ring-like arrangement 78, with one molded section 78 being disposed at each end of the shaft 20. Alternatively, rubber-like material 64 may be molded to the motor spindle shaft 20 in two spaced apart ring-like sections 78 and a molded body section such as, for example, a blanket arrangement 80 disposed between the ring-like sections 78 as shown in FIG. 4B. In this embodiment, the blanket section 80 is a thinner layer of rubber-like material than the ring-like sections 78. As another alternative, rubber-like material 64 may be molded to motor spindle shaft 20 in only a blanket arrangement 82 of substantially uniform thickness as shown in FIG. 4C.

The apparatus and method of the present invention comprise molding an elastomeric or rubber-like material to various components of a disk drive to reduce vibrations within the drive. Because it is molded to the disk drive component, the rubber-like material is mechanically and/or chemically bonded to the surface on which it is molded.

In addition to the selection of elastomers for vibration dampening, there are other factors to be considered when selecting materials for inclusion in a disk drive, especially when the housing is sealed. One of these factors is referred to as "outgassing", or the tendency of some materials to release molecules into the air within the sealed environment. Such molecules can accumulate on the surfaces of the disks or head sliders and lead to the deterioration of the critical hydrodynamic relationship between the heads and disks. This is especially important in current generations of disk drives where the heads are designed to "fly" at heights above the disk surface of only 1.5 to 2 microinches (3.8 to 5.1 microcentimeters). Furthermore, current disk drives are typically specified to operate over ambient temperature ranges of, for instance, from 0° C. to 40° C. Such an operating temperature range for the disk drive itself means that internal components, such as rubber-like materials suitable for the present invention, are subjected to much greater temperature variation. Thus, the selected elastomer must not outgas over this entire temperature range, and also must retain its dampening characteristics over this temperature range as well.

The materials useful in the present invention include elastomers and materials which possess rubber-like properties. Elastomers are generally characterized as all substances having the properties of natural, reclaimed, vulcanized or synthetic rubber. Those properties include but are not limited to the abilities to stretch under tension, to have a high tensile strength, to retract rapidly after deformation, and to recover fully to the original dimensions. Thus, almost any material displaying these properties may be employed in the present invention.

The present invention envisions that the selection of a rubber-like material will be made with foreknowledge of an existing undesirable vibration frequency in the disk drive, and should include criteria relating to the material's lack of outgassing and ability to maintain its dampening characteristics over the range of temperatures expected within the disk drive.

Those materials that have been found or are believed to be useful in the present invention include, but are not limited to, natural rubbers, butyl rubbers, silicone rubbers, polyacrylate rubbers, nitrile rubbers, isoprene rubbers, butadiene rubbers, EPT rubber, polyether rubbers, thermoplastic rubbers, fluorosilicones, fluoroelastomers, polychloroprene, polyacrylate, polyurethanes, acrylonitriles, styrene butadienes, epoxy resins, various other materials displaying rubber-like properties, and blends of any of the above.

Examples of specific rubber-like materials which are believed desirable for use according to the principles of the present invention include chloroprene manufactured by Bayer under the trade name Baypren; polychloroprene manufactured by Denki USA under the trade name Denka; and neoprene manufactured by DuPont under the trade name Neoprene. Other examples include urethane copolymers of diisocyanate having a polyester or polyether base, such as those manufactured by Uniroyal under the trade names Vibrathane and Adiprene and by TSE Industries under the trade name Millathane. Additional examples include fluoroelastomers or fluorocarbon elastomers, such as those manufactured by 3M Company under the trade names Fluorel and Aflas, by DuPont under the trade name Viton and by Ausimont USA under the trade name Tecnoflon. Further examples include the ethylene/acrylic elastomers manufactured by DuPont under the trade name VAMAC; the acrylic elastomers manufactured by Zeon Chemical under the trade name Hytemp; and the chlorosulfonated polyethylenes manufactured by DuPont under the trade name Hypalon. Of these specific examples of rubbers-like materials 64, the Viton and Neoprene manufactured by DuPont appear to be the most desirable.

The rubber-like material of the present invention may be a blend of various materials containing rubber-like properties. It is desirable for the rubber-like material to have a hardness of from about 5 to about 90 on a Shore A scale, and more desirable to have a hardness of from about 20 to about 80 on a Shore A scale. Of course, one of ordinary skill in the art will recognize that the optimum rubber-like material employed and the optimum range of Shore A hardness, as well as other properties, will depend upon the particular application in which the present invention is employed.

The rubber-like material 64 is molded to the desired components of the disk drive 10, rather than formed as separate and discrete disk drive components, and later assembled to form the disk drive. It is believed that any suitable molding technique well known in the art, such as transfer molding, injection molding or compression molding, can be employed in the present invention. It has been found desirable to employ transfer molding techniques.

In general, transfer molding involves using both heat and pressure to soften a rubber-like material located in a transfer chamber or cavity, and then forcing the softened material under high pressure through an orifice or transfer port into a closed mold where vulcanization and final curing take place. It is desirable for the rubber-like material to be allowed to cure for between about two minutes to about thirty minutes at temperatures ranging between about 250° F. to about 400° F. (121° C. to 204° C.) and more desirably at temperatures ranging between about 320° F. to about 360° F. (160° C. to 182° C.).

Satisfactory results have been obtained with samples of the stator motor components molded with the DuPont elastomer Neoprene, where the Neoprene has a Shore A hardness of 65, a tensile strength of 2,150 psi, an elongation of 630%, a 200% modulus of 1,175 psi and a specific gravity of 1.57. These mechanical properties were obtained by curing the Neoprene elastomer for fifteen (15) minutes at 324° F. (162° C.). Satisfactory results have also been obtained with samples of the stator motor and pivot assembly components molded with the DuPont elastomer Viton, where the Viton has a Shore A hardness of about 71, a tensile strength of about 1,452 psi, and elongation of about 341%, a 100% modulus of about 495 psi and a specific gravity of about 1.84. These properties were obtained by curing the Viton elastomer for eight (8) minutes at 350° F. (177° C.).

The test results of other rubber-like materials believed to suitable for applications in accordance with the present invention are tabulated below:

| Elastomer | Cure | Durometer (Shore A) | Tensile (psi) | % Elong. | 100% Modulus (psi) | 200% Modulus (psi) | Specific Gravity |
|---|---|---|---|---|---|---|---|
| Neoprene | 15 min. @ 162° C. | 65 | 2150 | 630 | — | 1175 | 1.57 |
| Viton | 8 min. @ 177° C. | 71 | 1453 | 341 | 495 | — | 1.84 |
| Hytemp-50 | 10 min. @ 177° C. | 50 | 1439 | 273 | 430 | 1032 | 1.25 |
| Hytemp-100 | 10 min. @ 177° C. | 80 | 1409 | 119 | 1348 | — | 1.364 |
| VAMAC | 20 min. @ 177° C. | 58 | 750 | 365 | — | 400 | 1.23 |
| Hypalon | 25 min. @ 162° C. | 63 | 1575 | 820 | — | 325 | 1.37 |
| Vibrathane (V-5008) | 20 min. @ 162° C. | 48 | 2350 | 430 | — | 900 | 1.28 |
| Vibrathane (V-5008) | 20 min. @ 162° C. | 68 | 1350 | 440 | — | 250 | 1.19 |

It is desirable for the disk drive component surface to be prepared before the molding step so as to improve bonding with the rubber-like material. Satisfactory results have been obtained with an exemplary surface preparation which includes first removing oil and other contaminants from the surface being molded to by using a suitable degreasing solvent or aqueous solution. Next, the surface to be molded is roughened or otherwise textured, for example, by sand blasting the surface with aluminum oxide "54" grit using compressed air or by a chemical etching method. After the surface has been textured, a primer is applied to the surface by brushing, spraying, etc. It is desirable for the primer to be applied at room temperature or between about 65° F. to about 90° F. (18° C. to 32° C.). Once applied, the primer is allowed to dry for at least about thirty (30) minutes to about an hour before the molding process is begun. While it is more desirable for the surface preparation to include both texturing and the use of a primer, the present invention is not intended to be so limited. For some applications, it may be desirable to only employ one or the other (i.e., texturing or the use of a primer).

When the DuPont elastomer Viton is used, satisfactory results have been obtained with a primer manufactured by Lord Corporation of Erie, Pennsylvania under the trade name Chemlok Adhesive 5150. When the DuPont elastomer Neoprene is used, satisfactory have been obtained using a primer manufactured by Morton International of West Alexandria, Ohio under the trade name Thixon Adhesive OSN-2.

After the molded disk drive component is removed from the mold cavity, it may be desirable to subject the as-molded rubber-like material to a post-cure bake in order to optimize its mechanical properties. When the DuPont elastomer Viton is used, a post-cure bake at 400° F. (204° C.) for sixteen (16) hours has been found to cause an improvement in the mechanical properties of the elastomer. Such a post-cure bake may not be necessary for the DuPont elastomer Neoprene.

Once the desired parts have been molded with the rubber-like material 64, the pivot assembly 57 is assembled. First, the inner surface 72 of the inner race 71 is disposed around the outer surface 59 of the pivot shaft 58. The inner surface 65 of the pivot housing 62 is disposed around the outer surface 70 of the outer race 69. It is desirable for the preloading to be enough to maintain such contact during the entire time that the head 48 is moved by the actuator assembly 44. Next, the inner race 71 and the outer race 69 are moved in opposite directions along the longitudinal axis 61 of the pivot shaft 58 so as to preload the bearing assembly 67 to maintain contact between the bearing 73 and the inner race 71 and outer race 69. The outer surface 59 of the pivot shaft 58 is then bonded to the inner surface 72 of the inner race 71 so as to form one bond joint. Next, the outer surface 70 of the outer race 69 is bonded to the inner surface 65 of the pivot housing 62 so as to form another bond joint. The pivot shaft 58 is bonded in relation to the inner race 71 and the outer race 69 is bonded in relation to the pivot housing 62 so as to maintain the preload on the bearing assembly 67. It is desirable for the preloading to be enough to maintain such contact during the entire time that the head 48 is moved by the actuator assembly 44. The rubber-like element forms at least part of at least one bond joint so as to provide the disk drive assembly 10 with improved vibration dampening characteristics.

The method of the present invention may also include the step of assembling the pivot assembly 57 into an actuator assembly 44 for rotatably supporting and moving at least one head 48 relative to at least one disk-like recording medium, such as disk 18, of a disk drive assembly so as to at least one of record and read information on the recording medium. Desirably, the method also includes the step of assembling the actuator assembly 44 into a disk drive assembly 10 comprising at least one disk-like recording medium 18, at least one head 48 for at least one of recording and reading information on the recording medium 18, and a motor 23 for rotating the recording medium 18, with the pivot housing 62 supporting the head 48 and being rotatable around the pivot shaft 58. More desirably, the method also includes the step of operating the disk drive assembly 10.

The molding step may also include one or more of the following steps: molding the rubber-like material 64 in the form of at least one rubber-like element 64a so as to bond to at least one of the outer surface 59 of the pivot shaft 58 and the inner surface 72 of the inner race 71; and molding the rubber-like material 64 in the form of at least one rubber-like element 64b so as to bond to at least one of the inner surface of the pivot housing 62 and the outer surface 70 of the outer race 69.

The molding step may also include at least one of transfer molding, injection molding, compression molding and like molding of the rubber-like material 64 to at least one of the outer surface 59 of the pivot shaft 58, the inner surface 65 of the pivot housing 62, the inner surface 72 of the inner race 71 and the outer surface 70 of the outer race 69.

The method of the present invention, for dampening vibrations in a disk drive, includes the step of providing a disk drive having various components with a rubber-like material molded thereto, as described earlier. The inclusion of selective components which have a rubber-like material molded thereto significantly reduces vibrations within the disk drive when the disk drive is operated. Of course, one of ordinary skill in the art will recognize that the amount of such a reduction will depend upon the particular design and style of the disk drive being employed, the amount of vibration present in the disk drive when selective components do not have a rubber-like material molded thereto, and the thickness and other dimensions of the molded rubber-like material. In general, the principles of the present invention can enable a disk drive to experience a reduction in vibrations of as low as about 75 decibels, as low as about 50 decibels, or even lower.

Having described the present invention in detail and by reference to the exemplary embodiments described hereinabove, it will be apparent to a person of skill in the art that numerous modifications and variations to the exemplary embodiments are possible without departing from the scope of the present invention as defined in the appended claims.

What is claimed is:

1. A disk drive assembly comprising:

at least one disk-like recording medium;

at least one head for at least one of recording and reading information on said at least one recording medium;

an actuator assembly for rotatable supporting and moving said at least one head relative to said at least one recording medium so as to at least one of record and read information on said at least one recording medium, said actuator assembly including a pivot assembly having a pivot shaft, a pivot housing and at least one pivot bearing mounted between said pivot shaft and said pivot housing, said pivot housing supporting said at least one head and being rotatable around said pivot shaft; wherein said at least one pivot bearing is a bearing assembly having an inner race with an inner surface, an outer race with an outer surface and at least one bearing disposed between said inner and outer race, and wherein said pivot shaft has a longitudinal axis and an outer surface;

at least one rubber-like material molded in the form of a first rubber-like element so as to be bonded to said outer surface of said pivot shaft to improve vibration dampening characteristics in said disk drive assembly, wherein said first rubber-like element is also bonded to said inner surface of said inner race, and said outer race is bonded in relation to said pivot housing such that said inner race and said outer race are shifted in opposite directions along said longitudinal axis so as to preload said bearing assembly to maintain contact between said at least one bearing and said inner and outer race during the moving of said at least one head by said actuator assembly; and a motor for rotating said at least one recording medium.

2. The disk drive assembly as set forth in claim 1, wherein said pivot housing has an inner surface, said at least one rubber-like material is also molded in the form of a second rubber-like element so as to be bonded to said inner surface of said pivot housing, and said second rubber-like element is also bonded to said outer surface of said outer race such that said inner race and said outer race are shifted in opposite directions along said longitudinal axis so as to preload said bearing assembly to maintain contact between said at least one bearing and said inner and outer race during the moving of said at least one head by said actuator assembly.

3. The disk drive assembly as set forth in claim 1, wherein said outer surface of said pivot shaft is at least one of a primed surface and a textured surface so as to provide a molded bond of sufficient strength, between said outer surface of said pivot shaft and said first rubber-like element, to withstand the preload on said bearing assembly.

4. The disk drive assembly as set forth in claim 1, wherein the bond formed by molding said first rubber-like element is at least one of a chemical bond and a mechanical bond of sufficient strength to withstand the preload on said bearing assembly.

5. A disk drive assembly comprising:

at least one disk-like recording medium;

at least one head for at least one of recording and reading information on said at least one recording medium;

an actuator assembly for rotatable supporting and moving said at least one head relative to said at least one recording medium so as to at least one of record and read information on said at least one recording medium, said actuator assembly including a pivot assembly having a pivot shaft, a pivot housing and at least one pivot bearing mounted between said pivot shaft and said pivot housing, said pivot housing supporting said at least one head and being rotatable around said pivot shaft; wherein said pivot housing has an inner surface, said at least one pivot bearing is a bearing assembly having an inner race with an inner surface, an outer race with an outer surface and at least one bearing disposed between said inner and outer race, and wherein said pivot shaft has a longitudinal axis and an outer surface;

at least one rubber-like material molded in the form of a rubber-like element so as to be bonded to said inner surface of said pivot housing to improve vibration dampening characteristics in said disk drive assembly, wherein said rubber-like element is also bonded to said outer surface of said outer race, and said inner surface of said inner race is bonded to said pivot shaft such that said inner race and said outer race are shifted in opposite directions along said longitudinal axis so as to preload said bearing assembly to maintain contact between said at least one bearing and said inner and outer race during the moving of said at least one head by said actuator assembly; and a motor for rotating said at least one recording medium.

6. A disk drive assembly comprising:

at least one disk-like recording medium;

at least one head for at least one of recording and reading information on said at least one recording medium;

an actuator assembly for rotatably supporting and moving said at least one head relative to said at least one recording medium so as to at least one of record and read information on said at least one recording medium, said actuator assembly including a pivot assembly having a pivot shaft, a pivot housing and at least one pivot bearing mounted between said pivot shaft and said pivot housing, said pivot housing supporting said at least one head and being rotatable around said pivot shaft; wherein said pivot housing has an inner surface, said at least one pivot bearing is a bearing assembly having an inner race with an inner surface, an outer race with an outer surface and at least one bearing disposed between said inner and outer race, and wherein said pivot shaft has a longitudinal axis and an outer surface;

at least one rubber-like material molded in the form of a first rubber-like element so as to be bonded to said inner surface of said inner race to improve vibration dampening characteristics in said disk drive assembly, wherein said first rubber-like element is also bonded to said outer surface of said pivot shaft, and said outer surface of said outer race is bonded to said inner surface of said pivot housing such that said inner race and said outer race are shifted in opposite directions along said longitudinal axis so as to preload said bearing assembly to maintain contact between said at least one bearing and said inner and outer race during the moving of said at least one head by said actuator assembly; and a motor for rotating said at least one recording medium.

7. The disk drive assembly as set forth in claim 6, wherein said at least one rubber-like material is also molded in the form of a second rubber-like element so as to be bonded to said outer surface of said outer race, said second rubber-like element is also bonded to said inner surface of said pivot housing such that said inner race and said outer race are shifted in opposite directions along said longitudinal axis so as to preload said bearing assembly to maintain contact between said at least one bearing and said inner and outer race during the moving of said at least one head by said actuator assembly.

8. A disk drive assembly comprising:

at least one disk-like recording medium;

at least one head for at least one of recording and reading information on said at least one recording medium;

an actuator assembly for rotatable supporting and moving said at least one head relative to said at least one recording medium so as to at least one of record and read information on said at least one recording medium, said actuator assembly including a pivot assembly having a pivot shaft, a pivot housing and at least one pivot bearing mounted between said pivot shaft and said pivot housing, said pivot housing supporting said at least one head and being rotatable around said pivot shaft; wherein said pivot housing has an inner surface, said at least one pivot bearing is a bearing assembly having an inner race with an inner surface, an outer race with an outer surface and at least one bearing disposed between said inner and outer race, and wherein said pivot shaft has a longitudinal axis and an outer surface;

at least one rubber-like material molded in the form of a rubber-like element so as to be bonded to said outer surface of said outer race to improve vibration dampening characteristics in said disk drive assembly, wherein said rubber-like element is also bonded to said inner surface of said pivot housing, and said inner surface of said inner race is bonded to said outer surface of said pivot shaft such that said inner race and said outer race are shifted in opposite directions along said longitudinal axis so as to preload said bearing assembly to maintain contact between said at least one bearing and said inner and outer race during the moving of said at least one head by said actuator assembly; and a motor for rotating said at least one recording medium.

9. An actuator assembly for rotatably supporting and moving at least one head relative to at least one disk-like recording medium of a disk drive assembly so as to at least one of record and read information on said at least one recording medium, said actuator assembly comprising:

a pivot assembly having a pivot shaft, a pivot housing and at least one pivot bearing assembly mounted between said pivot shaft and said pivot housing, said pivot shaft having a longitudinal axis and an outer surface, said pivot housing supporting said at least one head, being rotatable around said pivot shaft and having an inner surface, said at least one pivot bearing assembly including an inner race having an inner surface, an outer race having an outer surface and at least one bearing disposed between said inner and outer race, said outer surface of said pivot shaft being bonded to said inner surface of said inner race to form one bond joint, and said outer surface of said outer race being bonded to said inner surface of said pivot housing to form another bond joint; and at least one rubber-like material molded in the form of at least one rubberlike element so as to bond to at least one of said outer surface of said pivot shaft, said inner surface of said pivot housing, said inner surface of said inner race and said outer surface of said outer race, said at least one rubber-like element forming at least part of at least one said bond joint so as to provide the disk drive assembly with improved vibration dampening characteristics, wherein said pivot shaft is bonded in relation to said inner race and said outer race is bonded in relation to said pivot housing such that said inner race and said outer race are shifted in opposite directions along said longitudinal axis so as to preload said at least one pivot bearing assembly to maintain contact between said at least one bearing and said inner and outer race during the moving of the at least one head by the actuator assembly.

10. The actuator assembly as set forth in claim 9, wherein said at least one rubber-like element comprises a first rubber-like element which is molded so as to be bonded to said outer surface of said pivot shaft, and said first rubber-like element is also bonded to said inner surface of said inner race.

11. The actuator assembly as set forth in claim 10, wherein said at least one rubber-like element further comprises a second rubber-like element which is molded so as to be bonded to said inner surface of said pivot housing, and said second rubber-like element is also bonded to said outer surface of said outer race.

12. The actuator assembly as set forth in claim 9, wherein said at least one rubber-like element is molded so as to be bonded to said inner surface of said pivot housing, and said at least one rubber-like element is also bonded to said outer surface of said outer race.

13. The actuator assembly as set forth in claim 9, wherein said at least one rubber-like element comprises a first rubber-like element which is molded so as to be bonded to said inner surface of said inner race, and said first rubber-like element is also bonded to said pivot shaft.

14. The actuator assembly as set forth in claim 13, wherein said at least one rubber-like element further comprises a second rubber-like element which is molded so as to be bonded to said outer surface of said outer race, and said second rubber-like element is also bonded to said inner surface of said pivot housing.

15. The actuator assembly as set forth in claim 9, wherein said at least one rubber-like element is molded so as to be bonded to said outer surface of said outer race, and said at least one rubber-like element is also bonded to said inner surface of said pivot housing.

16. The actuator assembly as set forth in claim 9, wherein at least one of said outer surface of said pivot shaft, said inner surface of said inner race, said outer surface of said outer race and said inner surface of said pivot housing is at least one of a primed surface and a textured surface so as to provide a molded bond of sufficient strength with said at least one rubber-like element to withstand the preload on said at least one pivot bearing assembly.

17. The actuator assembly as set forth in claim 9, wherein the bond formed by molding said at least one rubber-like element is at least one of a chemical bond and a mechanical bond of sufficient strength to withstand the preload on said at least one pivot bearing assembly.

18. A pivot assembly for a disk drive actuator assembly rotatably supporting and moving at least one head relative to at least one disk-like recording medium of a disk drive assembly so as to at least one of record and read information on the at least one recording medium, said pivot assembly comprising:

a pivot shaft having a longitudinal axis and an outer surface;

a pivot housing supporting the at least one head, being rotatable around said pivot shaft and having an inner surface;

at least one pivot bearing assembly mounted between said pivot shaft and said pivot housing, said at least one pivot bearing assembly including an inner race having an inner surface, an outer race having an outer surface and at least one bearing disposed between said inner and outer race, said outer surface of said pivot shaft being bonded to said inner surface of said inner race to form one bond joint, and said outer surface of said outer race being bonded to said inner surface of said pivot housing to form another bond joint; and at least one rubber-like material molded in the form of at least one rubber-like element so as to bond to at least one of said outer surface of said pivot shaft, said inner surface of said pivot housing, said inner surface of said inner race and said outer surface of said outer race, said at least one rubber-like element forming at least part of at least one said bond joint so as to provide the disk drive assembly with improved vibration dampening characteristics, wherein said pivot shaft is bonded in relation to said inner race and said outer race is bonded in relation to said pivot housing such that said inner race and said outer race are shifted in opposite directions along said longitudinal axis so as to preload said at least one pivot bearing assembly to maintain contact between said bearing and said inner and outer race during the moving of the at least one head by the actuator assembly.

19. The pivot assembly as set forth in claim 18, wherein said at least one rubber-like element comprises a first rubber-like element which is molded so as to be bonded to said outer surface of said pivot shaft, and said first rubber-like element is also bonded to said inner surface of said inner race.

20. The pivot assembly as set forth in claim 19, wherein said at least one rubber-like element further comprises a second rubber-like element which is molded so as to be bonded to said inner surface of said pivot housing, and said second rubber-like element is also bonded to said outer surface of said outer race.

21. The pivot assembly as set forth in claim 18, wherein said at least one rubber-like element is molded so as to be bonded to said inner surface of said pivot housing, and said at least one rubber-like element is also bonded to said outer surface of said outer race.

* * * * *